Figure 1:
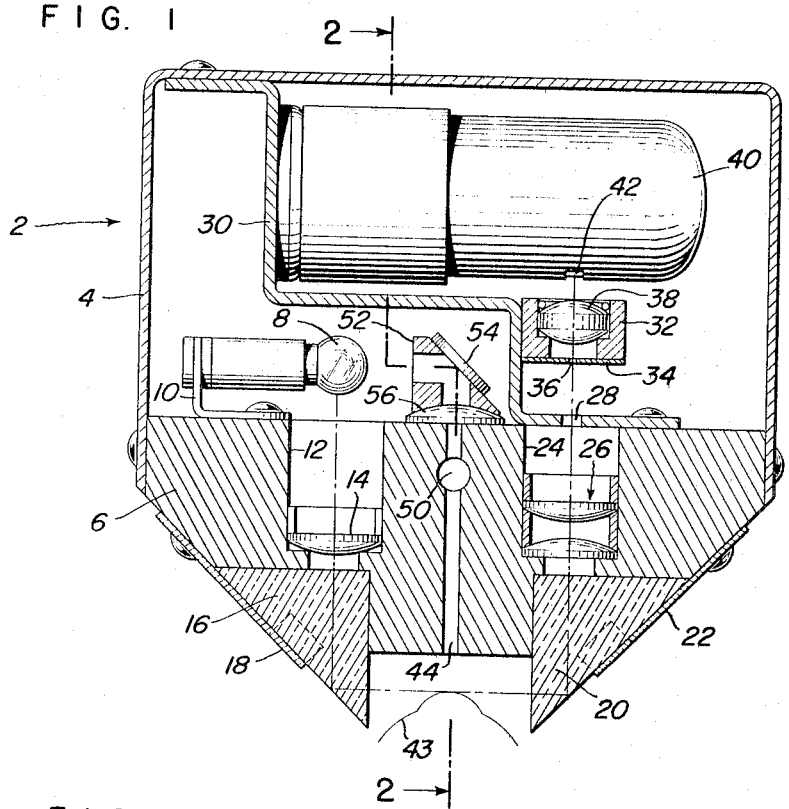

Feb. 21, 1967  N. L. STAUFFER  3,304,769
AIR PUFF TONOMETER
Filed May 29, 1964

INVENTOR.
NORMAN L. STAUFFER
BY Arthur H. Swanson
ATTORNEY.

United States Patent Office 3,304,769
Patented Feb. 21, 1967

3,304,769
AIR PUFF TONOMETER
Norman L. Stauffer, Englewood, Colo., assignor to Honeywell Inc., Minneapolis, Minn., a corporation of Delaware
Filed May 29, 1964, Ser. No. 371,208
6 Claims. (Cl. 73—80)

This invention relates to measuring apparatus, and more particularly, to a medical measuring instrumentality.

In accordance with the teaching of medical practice, it has been found that certain malfunctions of the human eye, such as glaucoma, produce an increase in the intra-ocular pressure. One means which has been heretofore employed in the early diagnosis of such malfunctions is a tonometer which determines the change in the pressure of the fluid within the eyeball by mechanically depressing the corneal area of the eyeball and determining the intra-ocular pressure as a function of the amount by which the cornea is depressed. Such prior art tonometers have all required physical contact between the tonometer and the eyeball. Physical contact between the instrument and the eyeball introduces serious undesirable disadvantages. The instrument must be sterilized each time it is used; the eyeball must be anesthetized; the eyeball may be damaged by abrasion; the accuracy of the instrument is determined by the skill of the operator, the steadiness of his hand and the immobility of the patent.

A non-contacting tonometer which avoids the foregoing disadvantages is shown, described and claimed in a co-pending application of Curtis D. Motchenbacher, Ser. No. 235,723, filed on Nov. 6, 1962, now Patent No. 3,181,351. Another non-contacting tonometer is shown, described and claimed in a co-pending application of the present inventor, Ser. No. 235,682, also filed on Nov. 6, 1962, now Patent No. 3,232,099. Both applications are assigned to the same assignee as is the present invention.

It is an object of the present invention to provide a tonometer of the non-contacting type and which includes improved structural features.

It is another object of the present invention to provide an improved tonometer which features an improved electro-optical detection system.

It is a further object of the present invention to provide a non-contacting tonometer which is independent of variations in eyeball reflectivity.

It is still another object of the present invention to provide an improved tonometer as set forth which exhibits greater freedom from sensitivity to position and body movements.

In accomplishing these and other objects, there has been provided, in accordance with the present invention, a tonometer wherein the instrument is brought into close proximity to but not in contact with the eyeball under test. The tonometer includes means for forming a narrow beam of light which is arranged to pass in a direction transverse to the surface of the eyeball under test. When the instrument is properly positioned, the corneal area of the eyeball under test will interrupt a predetermined portion of the light beam. Electro-optical means are provided for measuring the relative portion of the light beam which remains uninterrupted. A calibrated puff of air is directed toward the corneal area of the eyeball under test, causing a deformation thereof. This deformation of the eyeball causes a change in the portion of the light beam which is interrupted by the corneal area of the eyeball, producing a change in the signal developed in the electro-optical detection means. The signal thus produced is proportional to the deformation of the eyeball by the calibrated puff of air and is, therefore, a function of the intra-ocular pressure within the eyeball under test.

Figure 2:
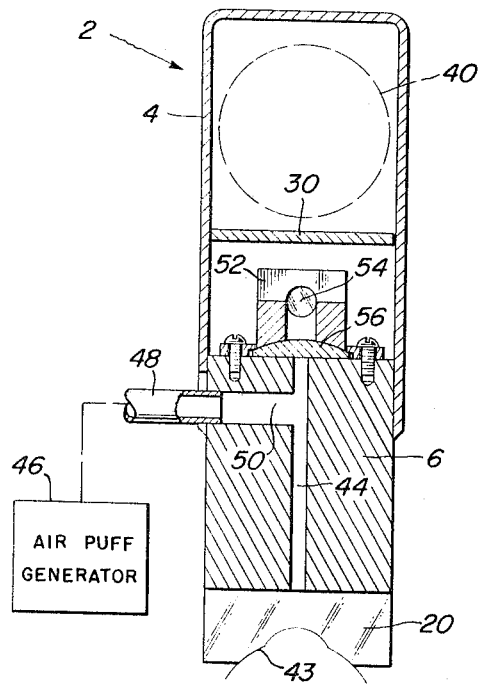

A better understanding of this invention may be had from the following detailed description when read in connection with the accompanying drawing wherein:

FIG. 1 is a cross-sectional view of a tonometer constructed in accordance with the present invention, and FIG. 2 is a cross-sectional view taken along the lines 2—2 of FIG. 1 and viewed in the direction of the appended arrows.

Referring now to the drawing in more detail there is shown a tonometer 2 having a housing member 4 secured to a base member 6, these two parts forming a main body structure. Mounted within the housing 4 is a light source represented by the lamp 8. The lamp 8 is mounted on a bracket 10 which positions the lamp 8 in alignment with a first opening 12 through the base member 6. Within the opening 12 there is positioned a condensing lens 14. An optical prism 16 is mounted in a recess in the base member 6 in a position to close the lower end of the opening 12. The prism 16 is held in position with respect to the base member 6 by a suitable clip 18.

In a similar recess on the opposite side of the base member 6, there is positioned a second prism 20. The second prism 20 is also held in position by a suitable spring clip 22. A second opening 24 through the base member 6 is arranged substantially parallel to the first opening 12 but in alignment with the second prism 20. Within the second opening 24 there is positioned a focusing lens system 26. The upper end (as viewed in FIG. 1) of the opening 24 is closed, except for the first aperture 28, by one end of the divider wall member 30. The divider wall member divides the chamber defined by the housing member 4 and the base member 6 into two light-tight compartments. A suitable mounting structure 32 is secured to the divider wall 30 and supports a second aperture plate 34, having therein a second aperture 36, and a lens 38. Also supported from the wall member 30 is an optical detecting device which may be, as shown, a photo-multiplier tube 40. Light from the source 8 passes through and is condensed by the lens 14. The light beam thus produced passes into the prism 16, is reflected from the remote surface thereof at an angle of about 90°. The reflected beam bridges the gap between the two prisms 16 and 20, passes into the prism 20 and is there reflected again by the remote surface thereof at an angle of about 90°. After the second reflection, the beam emerges from the prism 20 passes through the lens system 26, the aperture 28, the aperture 36, the lens 38, and into the window 42 of the photo-multiplier 40. The elements thus far described define what may be called a folded optical path between the light source and the detector or photo-multiplier tube.

The free space between the lower ends of the two prisms 16 and 20, as viewed in the drawing, define a receptacle into which a portion of the object under test may extend. In accordance with the present invention, that object may be a human eyeball 43. The portion of the optical path which lies between the two prisms 16 and 20, bridges the receptacle in a manner such as to be partially intercepted by the object under test. Thus, the receptacle constitutes a test or sensing zone. Through the center of the base member 6, and parallel to the openings 12 and 24 there is provided an air-puff passage 44 which opens into the sensing zone or receptacle. A calibrated air-puff from an air-puff generator 46 is fed to the passage 44 through a feeder tube 48 and a transverse air passage 50.

In operation the tonometer is placed in close proximity to but not touching the eyeball 43. The position is such that the cornea of the eyeball 43 intercepts or blocks approximately one-half of the useful portion of the beam of light passing between the two prisms 16 and 20. In this position the center of the cornea of the eyeball 43 should be in alignment with the axis of the air-puff passage 44. In order to facilitate the accomplishment of this relationship, means are provided for directing an auxiliary beam of light or a small portion of the light from the source 8 into the air-puff passage 44 along the axis thereof and directed toward the eyeball under test. Such means includes a mounting block 52 having a light passage therethrough. A mirror 54 is mounted on the mounting block 52 at a bend point in the light passage through the mounting block such as to cause the light beam from the source 8 to be directed into the air-puff passage 44. A lens 56 is held in position by the mounting block 52 between that mounting block and the upper surface of the base member 6. The lens in this position serves two purposes, first it serves as a condenser for the light from the light source 8 forming a small beam directed down the air-puff passage 44; second, it physically blocks the upper end of the passage 44 so that, when an air-puff is appled to the passage 44, that air is all directed toward the open end thereof adjacent the eyeball under test. This small light beam directed down the air-puff passage 44 constitutes a fixation image, a target at which the eye under test may focus. This helps to stabilize and center the eye with respect to the tonometer.

With the tonometer thus positioned, the main or sensing beam passes between the two prisms 16 and 20. That portion of the beam passing between the two prisms lies transverse to the corneal area of the eye under test, and is partially blocked or intercepted by that portion of eye lying in the beam's path. This blocking or interception of a portion of the beam partially obscures the light falling on the light sensor or photo tube 40. That amount of obscuration causes the phototube or sensor 40 to produce a reference signal.

A calibrated puff of air directed through the passage 44 will impinge on the eyeball 43 at an angle substantially normal to the surface of the eyeball and to the sensing beam. That calibrated air-puff will cause a slight, momentary deformation of the eyeball. That deformation of the eyeball changes the portion of transverse, or sensing, light beam obscured thereby, producing a corresponding change in the light falling on the sensor, or phototube 40, with a resultant change in the signal developed by the phototube. The change in the signal will be proportional to the deformation of the eyeball. Since the air-puff will be a calibrated puff, uniform from cycle to cycle, the only significant variable which will determine the surface deformation of the eyeball will be the intra-ocular pressure. Accordingly, the change in the signal developed by the phototube will be a function of the intra-ocular pressure. That signal may be applied to any suitable output device (not shown).

Since the main or sensing beam of light passes transversely of the eyeball under test, that beam may be made as bright as necessary to provide the desired sensitivity of the tonometer without resulting in any discomfort or danger to the patient. Further, since the sensing beam passes transversely of the eyeball under test, and test is based on a change in the partial obscuration of that beam, the present tonometer is less responsive to slight misalignments of the optical system with respect to the eyeball, to slight involuntary rotational movements of the eyeball during a test, or to variation in eyeball reflectivity than are those tonometers which rely on the reflective characteristic of the eyeball.

Thus it may be seen that there has been provided, in accordance with the present invention, an improved non-contacting tonometer with improved structural features and which exhibits a greater freedom sensitivity to eyeball reflectivity, and to position and eyeball movement.

What is claimed is:

1. A non-contacting tonometer comprising a body structure, a light source means mounted within said body structure, a light detector mounted within said body structure, means defining a controlled optical path between said light source means and said light detector, said optical path defining means including means further defining a sensing receptacle into which an eyeball under test extends, said optical path defining means including means for directing a portion of said path transversely of said receptacle whereat the light along said path is partially obscured by said eyeball when said eyeball is tested, and means for directing a calibrated puff of air into said receptacle toward said eyeball whereby to momentarily deform said eyeball thereby to change the obscuration of the light along said path in accordance with the deformation of said eyeball, said change in obscuration resulting in a corresponding change in the output of said detector.

2. A non-contacting tonometer comprising a body structure, a light source means mounted within said body structure, a light detector mounted within said body structure for producing an output signal in accordance with the light energy impinging thereon, means defining a controlled optical path between said light source means and said light detector, said optical path defining means including means further defining a sensing receptacle into which an eyeball under test extends, said optical path defining means including means for directing a portion of said path transversely of said receptacle whereat the light along said portion of said path is partially obscured by said eyeball when said eyeball is tested, means for directing an auxiliary beam of light into said receptacle as a fixation image for said eyeball, and means for directing a calibrated puff of air into said receptacle toward said eyeball whereby to momentarily deform said eyeball by an amount which is a function of the intra-ocular pressure thereby to change the obscuration of the light along said path in accordance with the deformation of said eyeball, said change in obscuration resulting in a corresponding change in the output signal of said detector.

3. A non-contacting tonometer comprising a light source means, a light detector for producing an output signal in accordance with the light energy impinging thereon, means defining a controlled optical path between said light source means and said detector defining a sensing light beam, said optical path defining means including means defining a sensing zone into which an object under test extends, said optical path being transverse of said sensing zone with respect to said object whereat said beam is partially obscured by said object, and means for directing a calibrated puff of air into said sensing zone, substantially normal to said optical path therein and toward the surface of said object whereby to produce a momentary deformation of said object in accordance with the internal pressure of said object, said deformation of said object producing a corresponding change in the obscuration of said beam whereby to produce a change in said output signal of said detector in accordance with said deformation.

4. A non-contacting tonometer comprising a light source means, a light detector for producing an output signal in accordance with the light energy impinging thereon, means defining a controlled optical path between said light source means and said detector establishing a sensing light beam, said optical path defining means including means defining a sensing zone into which the corneal area of an eyeball under test extends, said optical path being transverse of said sensing zone with respect to said eyeball whereat said beam is partially obscured by corneal area of said eyeball, means for directing a calibrated puff of air into said sensing zone substantially normal to said optical path therein and toward said corneal area of said eyeball whereby to produce a momentary deformation of said eyeball in accordance with the intra-ocular pressure, said deformation of said eyeball producing a corresponding change in the obscuration of said beam whereby to produce a change in said output signal of said detector in accordance with said deformation, and means for directing an auxiliary beam of light into said sensing zone substantially coaxially with said puff of air as a fixation image whereby to stabilize the position of said eyeball in said zone.

5. A non-contacting tonometer comprising a body structure including a base member and a housing member; partition means secured within said housing member dividing the interior of said body structure into two light-tight compartments; a light source means mounted within one of said compartments; a light detector mounted within said other compartment for producing an output signal in accordance with the light energy impinging thereon; means defining a controlled, folded optical path between said light source means and said detector for establishing a sensing beam; said optical path defining means including a first lens system mounted within a first opening through said base member, said first opening being in alignment with said light source means, a first right-angle prism mounted on said base member in alignment with said first opening and extending beyond the extremity of said base member, a second right angle prism mounted on said base member in spaced relation to said first prism and in alignment with a second opening through said base member, said second opening being arranged substantially parallel to said first opening, a second lens system mounted within said second opening, aperture plate means defining the effective dimension of said beam positioned in alignment with said second lens system, said second opening, said second lens system and said aperture plate means being in alignment with said detector, said first and second prisms defining, in the space between that portion of said prisms extending beyond said base member, a sensing zone into which the corneal portion of an eyeball under test may extend, said sensing beam passing between said prisms transversely with respect to and being partially obscured by said eyeball; said base member having a third opening therethrough substantially parallel to said first and second opening and being open to said sensing zone substantially normal to said transverse sensing beam therein; and means connected to said third opening for producing a calibrated air-puff therethrough toward said eyeball whereby to momentarily deform said eyeball by an amount which is a function of the intra-ocular pressure, said deformation of said eyeball producing a corresponding change in the obscuration of said beam whereby to produce a change in said output signal of said detector in accordance with said deformation.

6. A non-contacting tonometer comprising a body structure including a base member and a housing member; partition means secured within said housing member dividing the interior of said body structure into two light-tight compartments; a light source means mounted within one of said compartments; a light detector mounted within said other compartment for producing an output signal in accordance with the light energy impinging thereon; means defining a controlled, folded optical path between said light source means and said detector for establishing a sensing beam; said optical path defining means including a first lens system mounted within a first opening through said base member, said first opening being in alignment with said light source means, a first right-angle prism mounted on said base member in alignment with said first opening and extending beyond the extremity of said base member, a second right angle prism mounted on said base member in spaced relation to said first prism and in alignment with a second opening through said base member, said second opening being arranged substantially parallel to said first opening, a second lens system mounted within said second opening, aperture plate means defining the effective dimension of said beam positioned in alignment with said second lens system, said second opening, said second lens system and said aperture plate means being in alignment with said detector, said first and second prisms defining, in the space between that portion of said prisms extending beyond said member, a sensing zone into which the corneal portion of an eyeball under test may extend, said sensing beam passing between said prisms transversely with respect to and being partially obscured by said eyeball; said base member having a third opening therethrough substantially parallel to said first and second opening and being open to said sensing zone substantially normal to said transverse sensing beam therein; means connected to said third opening for producing a calibrated air-puff therethrough toward said eyeball whereby to momentarily deform said eyeball by an amount which is a function of the intra-ocular pressure, said deformation of said eyeball producing a corresponding change in the obscuration of said beam whereby to produce a change in said output signal of said detector in accordance with said deformation; and means for directing an auxiliary beam of light into said sensing zone through said third opening as a fixation image whereby to stabilize the position of said eyeball in said zone.

References Cited by the Examiner

UNITED STATES PATENTS

| | | | |
|---|---|---|---|
| 3,125,265 | 3/1964 | Warren et al. | 88—14 X |
| 3,181,351 | 5/1965 | Stauffer | 73—80 |
| 3,232,099 | 2/1966 | Motchenbacher | 73—80 |
| 3,246,507 | 4/1966 | Hyde | 73—80 |

RICHARD C. QUEISSER, *Primary Examiner.*

J. J. SMITH, *Assistant Examiner.*